US011809005B2

(12) United States Patent
Tobita et al.

(10) Patent No.: US 11,809,005 B2
(45) Date of Patent: Nov. 7, 2023

(54) LASER DEVICE

(71) Applicant: Fujikura Ltd., Tokyo (JP)

(72) Inventors: Hiroshi Tobita, Sakura (JP); Tomoharu Kitabayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 159 days.

(21) Appl. No.: 17/429,219

(22) PCT Filed: Feb. 27, 2020

(86) PCT No.: PCT/JP2020/008045
§ 371 (c)(1),
(2) Date: Aug. 6, 2021

(87) PCT Pub. No.: WO2020/175625
PCT Pub. Date: Sep. 3, 2020

(65) Prior Publication Data
US 2022/0128781 A1    Apr. 28, 2022

(30) Foreign Application Priority Data

Feb. 27, 2019  (JP) .................................. 2019-034376

(51) Int. Cl.
*G02B 6/42*  (2006.01)
*G08B 21/18*  (2006.01)

(52) U.S. Cl.
CPC .......... *G02B 6/4278* (2013.01); *G08B 21/18* (2013.01)

(58) Field of Classification Search
USPC .............. 340/657, 660, 652, 682, 661, 3.62, 340/825.29, 825.36, 825.69, 332, 815.57,
(Continued)

(56) References Cited

U.S. PATENT DOCUMENTS 4,663,520 A * 5/1987 Tanaka .................... A61B 18/20
976/DIG. 430
5,781,003 A * 7/1998 Kondo ................. G01R 15/241
324/96
(Continued)

FOREIGN PATENT DOCUMENTS

JP       H05-183224 A      7/1993
JP       06-066053 U   *  9/1994
(Continued)

OTHER PUBLICATIONS

International Search Report issued in International Application No. PCT/JP2020/008045, dated Jun. 9, 2020 (3 pages).

*Primary Examiner* — Daniel Previl
(74) *Attorney, Agent, or Firm* — Osha Bergman Watanabe & Burton LLP

(57) ABSTRACT

A laser device includes a light source, an optical fiber, a cable coating, an optical connector, a pair of disconnection detection lines, a pair of open detection lines, and a determination portion. The light source outputs a laser beam. The optical fiber propagates the laser beam. The optical fiber is inserted into the cable coating. The optical connector is connected to a tip of the cable coating. The pair of disconnection detection lines include a first disconnection detection line and a second disconnection detection line. The pair of open detection lines include a first open detection line and a second open detection line.

9 Claims, 2 Drawing Sheets

(58) Field of Classification Search
USPC .................................................. 340/815.68
See application file for complete search history.

(56) References Cited

U.S. PATENT DOCUMENTS

| | | | |
|---|---|---|---|
| 6,765,172 B1 * | 7/2004 | Liu | G02B 6/2856 |
| | | | 219/121.64 |
| 7,940,390 B2 * | 5/2011 | Kaertner | G01J 11/00 |
| | | | 356/229 |
| 2009/0097513 A1 * | 4/2009 | Grove | H01S 5/06825 |
| | | | 372/25 |
| 2012/0184818 A1 * | 7/2012 | Sugisawa | A61B 1/0051 |
| | | | 600/121 |
| 2016/0308609 A1 * | 10/2016 | Huang | H04B 10/2916 |

FOREIGN PATENT DOCUMENTS

| | | |
|---|---|---|
| JP | H06-066053 U | 9/1994 |
| JP | 2000-042771 A | 2/2000 |
| JP | 2001-185783 A | 7/2001 |
| JP | 2001-332784 A | 11/2001 |
| JP | 2003-279444 A | 10/2003 |
| JP | 2009-103802 A | 5/2009 |
| JP | 2017-223782 A | 12/2017 |
| JP | 2018-141786 A | 9/2018 |

\* cited by examiner

LASER DEVICE

CROSS-REFERENCE TO RELATED APPLICATIONS

This is a national phase application of International Patent Application No. PCT/JP2020/008045 filed Feb. 27, 2020, which claims the benefit of priority to Japanese Patent Application No. 2019-034376 filed Feb. 27, 2019. The full contents of these applications are incorporated herein by reference.

TECHNICAL FIELD

The present invention relates to a laser device.

BACKGROUND

In an optical fiber cable used in a laser device and propagating a high-power laser beam, it is required that an output of the laser beam can be quickly decreased when the optical fiber is damaged for some reason. Patent Document 1 describes a technique for detecting an abnormality that occurs in an optical fiber cable, such as when the optical fiber is damaged or when cooling water leaks.

PATENT DOCUMENT

[Patent Document 1] Japanese Unexamined Patent Application, First Publication No. 2018-141786

The outputs of the plurality of sensors described in Patent Document 1 are connected to an interlock circuit as one closed loop circuit, and when the output of one of the plurality of sensors is higher than a threshold value, that is, when one abnormal state among a plurality of detectable abnormal states is detected, an interlock circuit is cut off from the device. Since the interlock circuit is blocked regardless of the detected abnormal state, it is not possible to determine which abnormal state among the detectable abnormal states has occurred.

In addition, since it is not possible to determine which abnormal state among the plurality of abnormal states has occurred, it has not been possible to set the recovery means in accordance with the abnormal state in the laser device.

SUMMARY

The present invention has been made in view of the above circumstances, and provides a laser device capable of individually detecting a disconnection abnormality of an optical fiber and an opening abnormality in an optical connector.

A laser device according to one or more embodiments includes a light source that outputs a laser beam, an optical fiber that propagates the laser beam, a cable coating in which the optical fiber is inserted, an optical connector connected to a tip of the cable coating, a pair of disconnection detection lines, including a first disconnection detection line and a second disconnection detection line, where a first end portion of the first disconnection detection line and a first end portion of the second disconnection detection line are located inside the optical connector and are electrically connected inside the optical connector; a pair of open detection lines including a first open detection line and a second open detection line, where a first end portion of the first open detection line and a first end portion of the second open detection line are disposed inside the optical connector and are electrically disconnected inside the optical connector, and a determination portion to which a second end portion of the first disconnection detection line, a second end portion of the second disconnection detection line, a second end portion of the first open detection line, and a second end portion of the second open detection line are connected.

According to such a configuration, it is possible to individually detect a disconnection abnormality of the optical fiber and an opening abnormality in the optical connector.

A laser device according to one or more embodiments includes a pair of temperature detection lines which includes a first temperature detection line and a second temperature detection line, where a first end portion of the first temperature detection line and a second end portion of the second temperature detection line are disposed inside the optical connector and are electrically connected via a temperature sensor inside the optical connector, and where a second end portion of the first temperature detection line and a second end portion of the second temperature detection line are connected to the determination portion.

According to such a configuration, it is possible to individually detect a disconnection abnormality of the optical fiber, an opening abnormality in the optical connector, and a temperature abnormality inside the optical connector.

In the laser device according to one or more embodiments, the determination portion determines whether or not the first disconnection detection line and the second disconnection detection line are electrically connected, and determines whether or not the optical fiber is disconnected inside the cable coating and inside the optical connector.

When a disconnection occurs in the optical fiber and laser light is emitted from the disconnection portion, the first disconnection detection line or the second disconnection detection line is blown. When fusing occurs, the state in which the first disconnection detection line and the second disconnection detection line are electrically connected changes to an electrically disconnected state. By determining the change in the state by the determination portion, it is possible to detect a disconnection abnormality of the optical fiber.

In the laser device according to one or more embodiments, the determination portion determines whether or not the first open detection line and the second open detection line are electrically connected, and determines whether or not the optical connector is open.

When connecting the optical fiber cable to the laser head, a connecting member (bayonet) provided on the laser head and an optical connector of the optical fiber cable are connected. Here, if a short circuit is provided in the connecting member so that the first open detection line and the second open detection line are electrically connected, the optical fiber cable is normally connected to the laser head. If so, the first open detection line and the second open detection line are electrically connected. On the other hand, when a poor connection occurs between the optical fiber cable and the laser head, the first open detection line and the second open detection line remain electrically disconnected. By determining the change in the state with the determination portion, it is possible to detect an opening abnormality of the optical connector.

In the laser device according to one or more embodiments, the determination portion determines whether or not the temperature inside the optical connector detected by the temperature sensor exceeds a predetermined threshold value, and determines a temperature abnormality inside the optical connector.

According to such a configuration, the determination portion can compare the voltage indicating the temperature information inside the optical connector with the voltage serving as the threshold value of the temperature abnormality determined in advance, and detect the temperature abnormality inside the optical connector.

In the laser device according to one or move embodiments, the determination portion notifies the first alarm when the optical fiber is determined to be broken, and notifies the second alarm when the optical connector is determined to be open.

According to such a configuration, since the alarm notified when the optical fiber is broken and the alarm notified when the optical connector is open are different, the user of the laser device can know the contents of the abnormality that has occurred in the laser device. As a result, it is possible to inform the user of the laser device to take appropriate action.

In the laser device according to one or more embodiments, the determination portion notifies a second alarm when the optical connector is determined to be open, and notifies a third alarm when a temperature abnormality determined to have occurred inside the optical connector.

According to such a configuration, since the alarm notified when the optical connector is open and the alarm notified when a temperature abnormality occurs inside the optical connector are different, the user of the laser device can know the contents of the abnormality that has occurred in the laser device. As a result, it is possible to inform the user of the laser device to take appropriate action.

In the laser device according to one or more embodiments, the determination portion sets a first alarm level when the optical fiber is determined to be broken, and sets a second alarm level when the optical connector is determined to be open, and the method of canceling the first alarm level and the method of canceling the second alarm level are different.

According to such a configuration, since the recovery means of the device can be set according to the abnormal state of the laser device, it is possible to obtain both safety and convenience in using the laser device.

In the laser device according to one or more embodiments, the determination portion sets a second alarm level when that the optical connector is determined to be open, and sets a third alarm level when a temperature abnormality determined to have occurred inside the optical connector, and the method of canceling the second alarm level and the method for canceling the third alarm level are different.

According to such a configuration, since the recovery means of the device can be set according to the abnormal state of the laser device, it is possible to obtain both safety and convenience in using the laser device.

As described above, according to the laser device according to one or more embodiments, it is possible to individually detect a disconnection abnormality of the optical fiber and an opening abnormality of the optical connector.

DETAILED DESCRIPTION

Hereinafter, embodiments of the laser device according to the present invention are described in detail with reference to the drawings.

First, the configuration of a laser device 1 of one or more embodiments is described.

Figure 1:
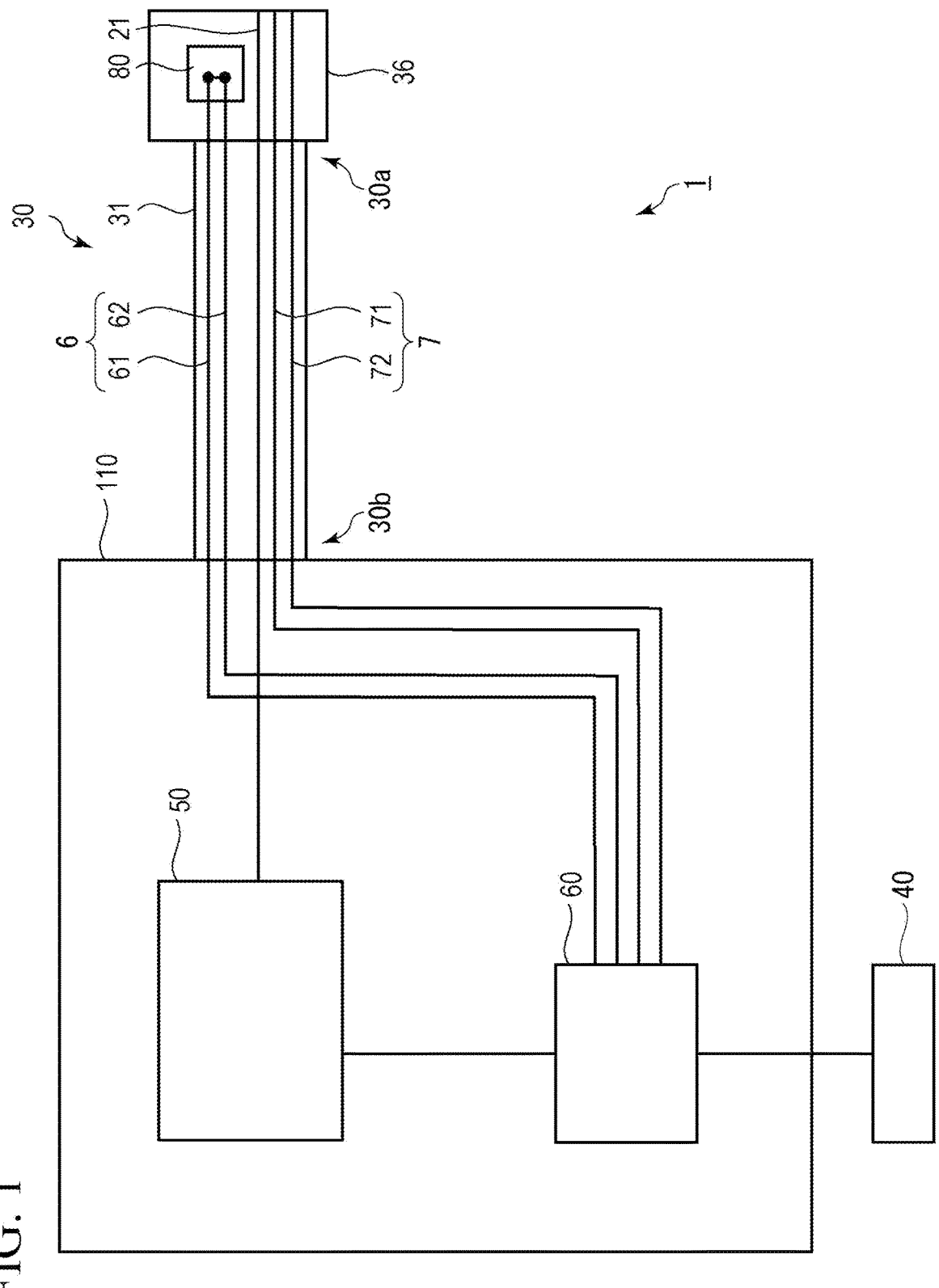
FIG. 1 is a conceptual diagram showing a laser device according to one or more embodiments.

FIG. 1 is a conceptual diagram showing the laser device according one or more embodiments. As shown in FIG. 1, the laser device 1 of one or more embodiments includes an optical fiber cable 30 and a laser system main body 110 as main configurations.

The laser system main body 110 has a light source 50 and a determination portion 60. The second end portion 30*b* of the optical fiber cable 30 is connected to the laser system main body 110.

The optical fiber cable 30 includes an optical fiber 21, an open detection line 7, a disconnection detection line 6, a cable coating 31, and an optical connector 36.

The optical fiber 21 includes a bare fiber and a coating layer formed on the outer periphery of the bare fiber. The bare fiber is formed of, for example, quartz-based glass and transmits light. The bare fiber has a core and a clad covering the core. The optical fiber 21 is preferably a multimode fiber having a core diameter of about 50 μm to 100 μm and a clad outer diameter of about 360 μm, for example.

The light source 50 is a laser light source that emits signal light having a predetermined wavelength, and is, for example, a fiber laser device or a solid-state laser device. When the light source 50 is a fiber laser device, it may be a resonator type fiber laser device or a fiber laser device of a Master Oscillator-Power Amplifier (MO-PA) type. The signal light emitted from the light source 50 is, for example, light having a wavelength of 1070 nm. The signal light is not limited to the light including the signal.

The light source 50 may have a configuration in which laser light from a plurality of laser portions is combined by an optical combiner and output.

The laser light output from the light source 50 propagates through the optical fiber 21 and is emitted from the optical connector 36 to the outside of the optical connector 36.

The light source 50 and the determination portion 60 are arranged in the laser system main body 110, and one end of the cable coating 31 is connected to the laser system main body 110.

Examples of the material of the cable coating 31 that can be used include polyolefins (PO) such as polyethylene (PE), polypropylene (PP), ethylene ethyl acrylate copolymer (EEA), ethylene vinyl acetate copolymer (EVA), and ethylene propylene copolymer (EP) resin, and polyvinyl chloride (PVC) and the like.

The optical fiber cable 30 which is a portion of the laser device 1 will be described with reference to FIGS. 1 to 4. In FIGS. 1 to 4, the same or corresponding components are designated by the same reference numerals, and duplicate description will be omitted. The optical fiber cable 30 mainly includes an optical fiber 21, a cable coating 31 through which the optical fiber 21 is inserted, and an optical connector 36 attached to a tip of the cable coating 31.

(Open Detection Line)

Figure 2:
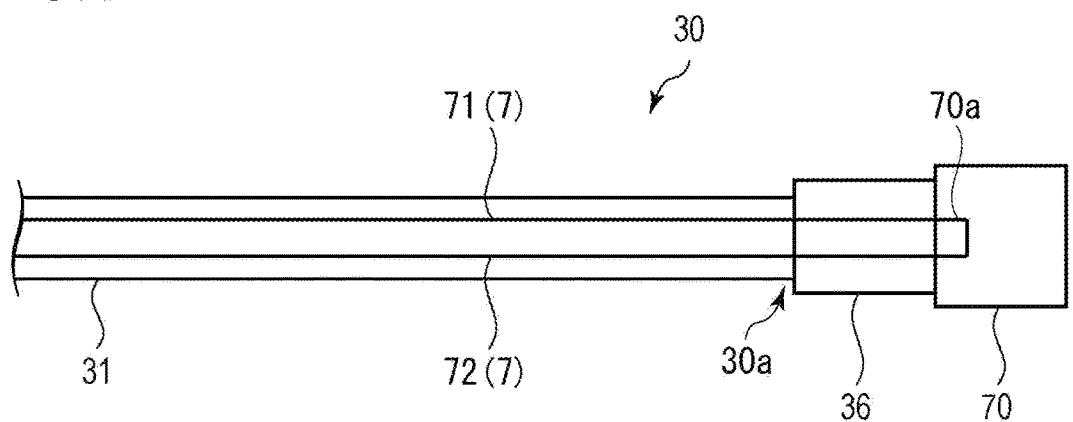
FIG. 2 is a conceptual diagram showing a portion of the laser system (open detection line) according to one or more embodiments.

FIG. 2 shows the opening detection portion of the laser device 1. The optical connector 36 arranged at a first end portion 30*a* of the optical fiber cable 30 is connected to a connecting member (bayonet) 70 provided on a laser head (not shown). Note that, in FIG. 2, the configuration other than the open detection portion of the laser device 1 is not shown for the sake of explanation.

As shown in FIG. 2, the pair of open detection lines 7 are inserted through the cable coating 31. The open detection line 7 is made of, for example, a conductive metal. The pair of open detection lines 7 has a first open detection line 71 and a second open detection line 72. A first end portion of the first open detection line 71 extends to the inside of the optical connector 36. Similarly, a first end portion of the second open detection line 72 extends to the inside of the optical connector 36. The first end portion of the first open detection line 71 and the second open detection line 72 arranged in the optical connector 36 are not electrically connected.

In addition, a second end portion of the first open detection line 71 and a second end portion of the second open detection line 72 are connected to the determination portion 60 as shown in FIG. 1 and are electricity connected via the determination portion 60.

As shown in FIG. 2, when the optical fiber cable 30 is connected to the laser head (not shown), the connecting member 70 provided in the laser head and the optical connector 36 of the optical fiber cable 30 are connected. Here, the connecting member 70 is provided with a short-circuit circuit 70a, and when the connecting member 70 and the optical connector 36 are normally connected, the first open detection line 71 and the second open detection line 72 are electrically connected.

In such a manner, the determination portion 60 monitors the energized state of the electrical circuit (closed circuit) between the first open detection line 71 and the second open detection line 72. When the determination portion 60 detects that the circuits of the open detection lines 7 are energized and the connecting member 70 and the optical connector 36 are normally connected, the laser device 1 emits the laser beam. As a result, the determination portion 60 controls the light source 50 and transmits information to the light source 50 that the laser device 1 is in a state where the laser light can be emitted.

On the other hand, if the connecting member 70 and the optical connector 36 are not normally connected (that is, if a connection failure occurs), or if nothing is connected to the optical connector 36, the first open detection line 71 and the second open detection line 72 are not electrically connected. In the present case, a closed circuit is not formed between the first open detection line 71 and the second open detection line 72. The determination portion 60 that monitors the energized state determines that the connection member 70 and the optical connector 36 are not normally connected. As a result, the determination portion 60 controls the light source 50 so that the laser device 1 does not emit the laser beam. As a result, the laser device 1 stops emitting the laser beam, so that it is possible to prevent the laser beam from being erroneously emitted from between the connecting member 70 and the optical connector 36. In addition, since it is possible to prevent the laser beam from being irradiated toward the user, the safety of the user is ensured.

In such a manner, it is possible to determine whether or not a connection failure between the connecting member 70 and the optical connector 36 has occurred depending on whether or not the first open detection line 71 and the second open detection line 72 are energized. This makes it possible to detect a poor connection between the optical fiber cable 30 and the laser head.

(Disconnection Detection Line)

Figure 3:
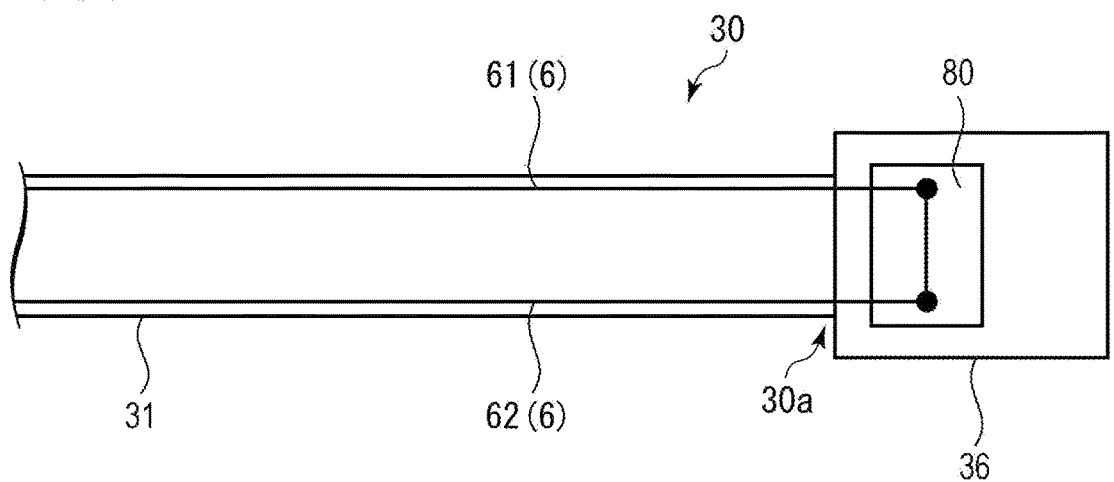
FIG. 3 is a conceptual diagram showing a portion of the laser system (disconnection detection line) according one or more embodiments.

FIG. 3 shows the disconnection detection portion of the laser device 1. The optical connector 36 arranged at the first end portion 30a of the optical fiber cable 30 includes a circuit board 80. Note that, in FIG. 3, the configuration other than the disconnection detection portion of the laser device 1 is not shown for the sake of explanation.

As shown in FIG. 3, a pair of disconnection detection lines 6 are inserted through the cable coating 31. The disconnection detection line 6 is made of, for example, a conductive metal. The pair of disconnection detection lines 6 has a first disconnection detection line 61 and a second disconnection detection line 62. The first end portion of the first disconnection detection line 61 extends to the inside of the optical connector 36 and is connected to a circuit board 80 in the optical connector. In addition, the first end portion of the second disconnection detection line 62 extends to the inside of the optical connector 36 and is connected to the circuit board 80 in the optical connector. The first end portion of the first disconnection detection line 61 and the second disconnection detection line arranged in the optical connector 36 are electrically connected to each other via the circuit board 80.

In addition, the second end portion of the first disconnection detection line 61 and the second end portion of the second disconnection detection line 62 are connected to the determination portion 60 as shown in FIG. 1, and are electrically connected via the determination portion 60.

Here, when the optical fiber 21 is disconnected for some reason, the laser beam is emitted from the disconnected portion, and the first disconnection detection line 61 or the second disconnection detection line 62 is melted.

As a result, the energization of the closed circuit formed between the first disconnection detection line 61 and the second disconnection detection line 62 is cut off. The determination portion 60 that monitors the energization state of the circuit detects the disconnection of the optical fiber 21 due to the interruption of energization, and determines that the laser device 1 cannot emit the laser light. The determination portion 60 controls the light source 50 so that the laser device 1 does not emit the laser beam. As a result, the emission of the laser beam is stopped in the laser device 1. In addition, since it is possible to prevent the laser beam from being emitted from the disconnected portion and irradiating a peripheral device and the operator, it is possible to prevent damage to the peripheral device and ensure the safety of the operator.

(Temperature Detection Line)

Figure 4:
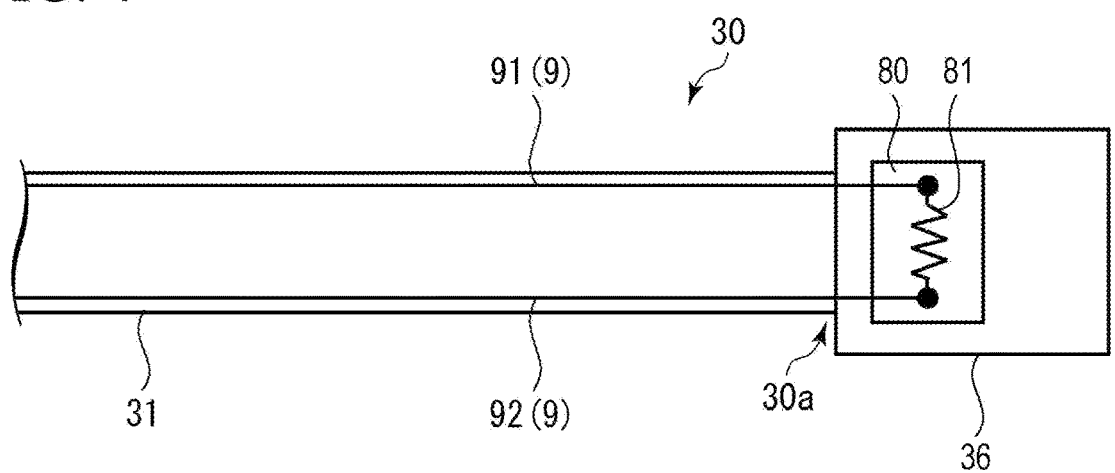
FIG. 4 is a conceptual diagram showing a portion of the laser system (temperature detection line) according one or more embodiments.

For example, the laser device 1 may include the temperature detection line shown in FIG. 4 in place of or as an additional configuration of the disconnection detection line shown in FIG. 3.

As shown in FIG. 4, the pair of temperature detection lines 9 are inserted through the cable coating 31. The temperature detection lines 9 are made of, for example, a conductive metal. The pair of temperature detection lines 9 has a first temperature detection line 91 and a second temperature detection line 92. One end of the first temperature detection line 91 and one end of the second temperature detection line 92 are electrically connected to each other inside the optical connector 36 via a temperature sensor 81. In FIG. 4, a thermistor is arranged as the temperature sensor 81 on the circuit board 80 arranged in the optical connector 36. By connecting one end of the first temperature detection line 91 and one end of the second temperature detection line 92 to the circuit board 80, the first temperature detection line 91 and the second temperature detection line 92 are electrically connected via the thermistor. The first end portion of the first open detection line 71 extends to the inside of the optical connector 36. In addition, the first end portion of the second open detection line 72 extends to the inside of the optical connector 36. The first end portion of the first open detection line 71 and the second open detection line 72 arranged in the optical connector 36 are not electrically connected.

The thermistor is an electronic component whose resistance value changes with a change in temperature, and a voltage indicating temperature information is input to the determination portion 60. With such a configuration, it becomes possible to monitor the temperature inside the optical connector.

In addition, the second end portion of the first temperature detection line and the second end portion of the second temperature detection line are connected to the determination portion 60.

Here, when the temperature inside the optical connector 36 rises above a predetermined threshold value, the determination portion 60 determines that a temperature abnormality has occurred in the optical connector 36. As a result, the determination portion 60 controls the light source 50, and the emission of the laser light is stopped in the laser device 1 to ensure safety.

(Alarm Notification)

As shown in FIG. 1, when an abnormality occurs in the laser device 1, the determination portion 60 can notify a display portion 40 of an alarm and display the occurrence. In addition, the display of the alarm (first alarm) notified when the optical fiber is broken, the display of the alarm (second alarm) notified when the optical connector 36 is open, and the display of the alarm (third alarm) notified when a temperature abnormality has occurred inside the optical connector 36 are different. As a result, the user of the laser device can know the contents of the abnormality that has occurred in the laser device. Furthermore, it is possible to inform the user of the laser device to take appropriate action.

For example, if an alarm (first alarm) notified when the optical fiber is broken is displayed on the display portion, the laser device needs to be repaired, and the user can ask the laser device manufacturer to repair the laser device.

When an alarm (second alarm) notified when the optical connector is open is displayed on the display portion, the user can normally connect the optical connector 36 of the laser device 1 and the connecting member 70. As described above, the operation of attaching the optical connector 36 and the connecting member 70 can be performed again.

As described above, according to the laser device 1 of one or more embodiments, the user can know the contents of the abnormality occurred in the laser device. As a result, it is possible to inform the user to take appropriate action according to the abnormal state of the laser device.

As for the alarm notification means, the laser device 1 itself may have a function of outputting an alarm sound, or in addition to this function, it may have a function of outputting light from such as a patrol lamp.

The display portion 40 may be a terminal that performs information processing, such as a PC connected to the laser device 1.

(Setting and Canceling Alarm Level)

The determination portion 60 sets an alarm level according to the abnormal state of the laser device 1, and stores the alarm level in the memory (not shown) of the determination portion 60. In particular, when the disconnection of the optical fiber is detected, the first alarm level is stored in the memory, and when the opening of the optical connector 36 is detected, the second alarm level is stored in the memory. When a temperature abnormality inside the optical connector is detected, a third alarm level is stored in the memory. In addition, the determination portion 60 stops the emission of the laser beam in the laser device 1 until the first alarm level, the second alarm level, and the third alarm level are released.

For example, a maintenance engineer of a laser device manufacturer inputs a specific command to a terminal (not shown) which processes information such as a PC connected to the laser device 1 after repairing the laser device 1; thereby, the first alarm level which is set when a disconnection of the optical fiber is detected is released. As a result, the laser device 1 can emit the laser beam.

In addition, the second alarm level set when the opening of the optical connector is detected is released, for example, when the user normally attaches the optical connector 36 and the connecting member 70. As a result, the laser device 1 can emit the laser beam.

In addition, the third alarm level set when a temperature abnormality inside the optical connector is detected is released, for example, when the temperature inside the optical connector drops to a predetermined threshold value. As a result, the laser device 1 can emit the laser beam.

As described above, the method of canceling the first alarm level, the second alarm level, and the third alarm level may be different.

Conventionally, since it is not possible to determine which of a plurality of abnormal states has occurred, it may not be possible to set a recovery means according to an abnormal state in a laser device. As a result, when safety is important, the laser device cannot be recovered on the user side even if the user can handle the opening detection of the optical connector, for example. Therefore, the convenience to the user may be impaired.

On the other hand, according to the laser device 1 of one or more embodiments, since a recovery means of the laser device can be set according to the abnormal state of the laser device, both safety and convenience in using the laser device can be obtained.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF THE REFERENCE SYMBOLS

1: Laser device
6: Disconnection detection line
7: Open detection line
9: Temperature detection line
36: Optical connector
21: Optical fiber
30: Optical fiber cable
31: Cable coating
40: Display portion
50: Light source
60: Determination portion
61: First disconnection detection line
62: Second disconnection detection line
71: First open detection line
72: Second open detection line 80: Circuit board
81: Temperature sensor
91: First temperature detection line
92: Second temperature detection line

The invention claimed is:

1. A laser device, comprising:
a light source that outputs a laser beam;
an optical fiber that propagates the laser beam;
a cable coating in which the optical fiber is inserted;
an optical connector connected to a tip of the cable coating;
a pair of disconnection detection lines consisting of a first disconnection detection line and a second disconnection detection line that are inserted through the cable coating and that detect a disconnection of the optical fiber,
wherein a first end portion of the first disconnection detection line and a first end portion of the second disconnection detection line are disposed inside the optical connector and are electrically connected inside the optical connector;
a pair of open detection lines consisting of a first open detection line and a second open detection line, wherein a first end portion of the first open detection line and a first end portion of a second open detection line are disposed inside the optical connector and are electrically disconnected inside the optical connector; and
a determination portion to which a second end portion of the first disconnection detection line, a second end portion of the second disconnection detection line, a second end portion of the first open detection line, and a second end portion of the second open detection line are connected.

2. The laser device according to claim 1, further comprising:
a pair of temperature detection lines consisting of a first temperature detection line and a second temperature detection line,
wherein a first end portion of the first temperature detection line and a second end portion of the second temperature detection line are disposed inside the optical connector and are electrically connected via a temperature sensor inside the optical connector, and
wherein a second end portion of the first temperature detection line and a second end portion of the second temperature detection line are connected to the determination portion.

3. The laser device according to claim 2, wherein the determination portion determines whether or not the temperature inside the optical connector detected by the temperature sensor exceeds a predetermined threshold value, and determines a temperature abnormality inside the optical connector.

4. The laser device according to claim 3, wherein the determination portion notifies a second alarm when the optical connector is determined to be open, and notifies a third alarm when a temperature abnormality is determined to have occurred inside the optical connector.

5. The laser device according to claim 3, wherein
the determination portion sets a second alarm level when the optical connector is determined to be open, and sets a third alarm level when a temperature abnormality is determined to have occurred inside the optical connector, and
a method of canceling the second alarm level and a method for canceling the third alarm level are different.

6. The laser device according to claim 1, wherein the determination portion determines whether or not the first disconnection detection line and the second disconnection detection line are electrically connected, and determines whether or not the optical fiber is disconnected inside the cable coating and inside the optical connector.

7. The laser device according to claim 1, wherein the determination portion determines whether or not the first open detection line and the second open detection line are electrically connected, and determines whether or not the optical connector is open.

8. The laser device according to claim 1, wherein the determination portion notifies a first alarm when the optical fiber is determined to be broken, and notifies a second alarm when the optical connector is determined to be open.

9. The laser device according to claim 1, wherein
the determination portion sets a first alarm level when the optical fiber is determined to be broken, and sets a second alarm level when the optical connector is determined to be open, and
a method of canceling the first alarm level and a method of canceling the second alarm level are different.

* * * * *